Figure 1:
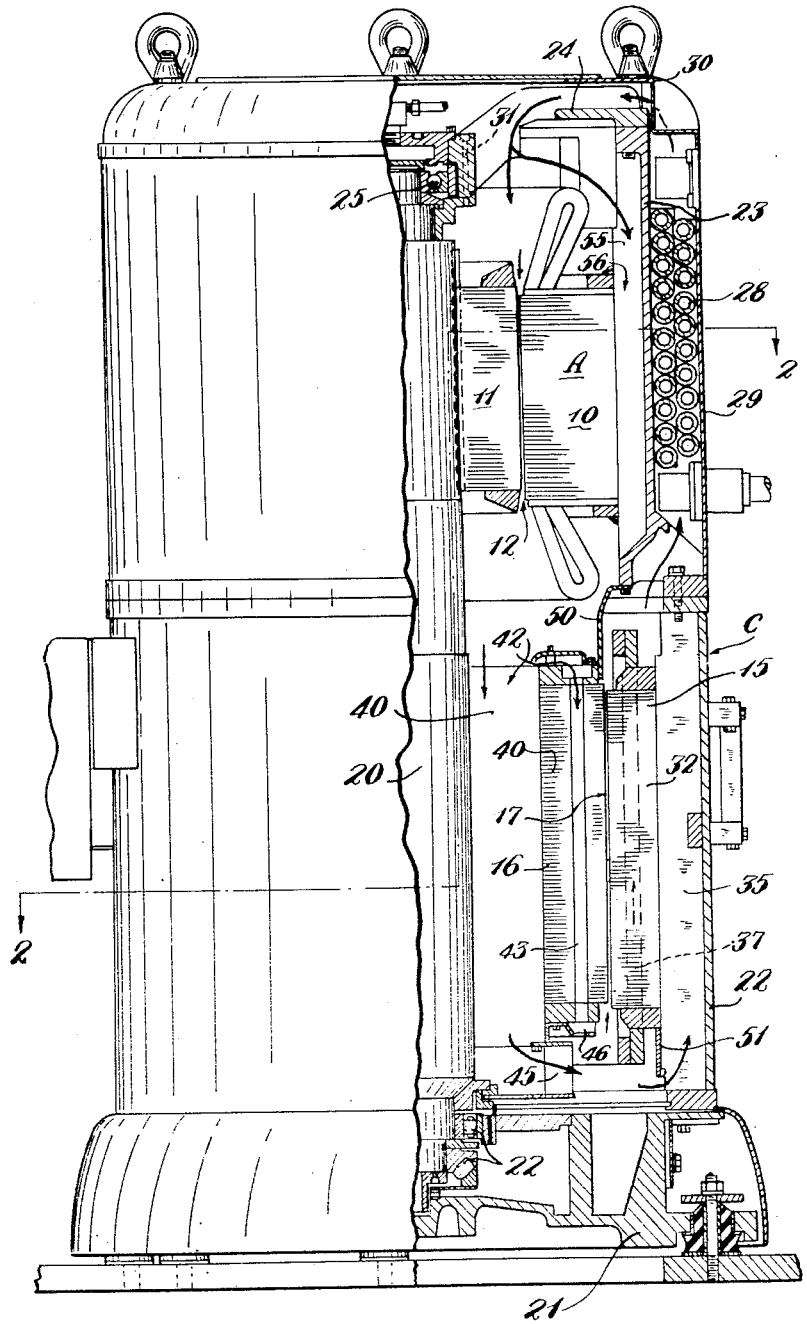

INVENTORS
EDWARD J. KACZOR
BY CLARENCE F. SCHWAN
ATTORNEY

Oct. 26, 1954  E. J. KACZOR ET AL  2,692,956
TOTALLY-ENCLOSED HIGH-FREQUENCY GENERATOR
Filed Sept. 20, 1951  2 Sheets-Sheet 2

INVENTORS
EDWARD J. KACZOR
BY CLARENCE F. SCHWAN
ATTORNEY

Patented Oct. 26, 1954

2,692,956

UNITED STATES PATENT OFFICE 2,692,956

TOTALLY-ENCLOSED HIGH-FREQUENCY GENERATOR

Edward J. Kaczor and Clarence F. Schwan, Cleveland, Ohio, assignors to The Ohio Crankshaft Company, Cleveland, Ohio, a corporation of Ohio Application September 20, 1951, Serial No. 247,432

6 Claims. (Cl. 310—57)

1

This invention pertains to the art of motors or generators and, more particularly, to a totally-enclosed unit of this type with provision for cooling same.

The invention is particularly adapted for use with high-frequency motor generators of the inductor-alternator type and will be described with reference to such equipment, although it will be appreciated that the invention is not so limited.

In high-frequency inductor alternators, large amounts of heat are developed internally of the equipment. This heat is not only due to the $I^2R$ losses in the copper windings, but is also due to eddy current and hysteresis losses in the magnetic laminations of the alternator caused by the high-frequency flux variations therein. In either event, the heat must be removed as fast as it is generated.

In early design of this equipment, it was conventional to draw large volumes of cooling air into one end of the generator, pass it over the portions to be cooled and discharge it from the other end. Clearances in inductor alternators are extremely small and the dirt, which is so prevalent in manufacturing establishments, soon caused difficulties with the small clearances between the rapidly-moving surfaces. Next, the entire generator was enclosed in a cabinet and the cooling air was continuously recirculated through the generator, into the cabinet and over cooling coils which would remove the heat in the air. Such a construction is shown in the patent to F. S. Denneen, et al., 2,466,007 dated April 5, 1949. Such equipment was unduly bulky.

The next step in the design of equipment of this type was to provide a totally-enclosed motor generator wherein the motor and generator stator members were enclosed in a water jacket. Air was circulated axially through passages in the rotor to remove the heat generated there and then in the opposite direction over the outside of the water jacket where it was cooled. With such a construction, there was a direct removal of heat from the stator to the water jacket by conduction in the metals. Because of this, the stator, particularly at low power outputs, tended to operate at lower temperatures than the rotor. The rotor thus expanded more than the stator and, because of the small clearances involved, it often happened that the rotor rubbed against the stator. Constructions of this type are shown in the patent to Johns, 2,414,532 dated January 21, 1947, and in the patent to Schwan, 2,505,795 dated May 2, 1950.

A further objection to the type of construction shown in these patents is that the generator tended to become unduly bulky because of the extra diameter required for the cooling jacket when it surrounds the generator stator and the air passage outside of the jacket. The type of construction was also expensive.

The present invention contemplates a totally-enclosed motor, generator, or combination of both, which provides even cooling of the stator and the rotor, has a minimum bulk, employs auxiliary cooling means for removing the heat generated internally and is economically and easily manufactured.

In accordance with the invention, rotating electrical equipment, comprising a stator and a rotor, is totally enclosed in a sealed housing, the rotor and stator each having axial passages therethrough. Fan means are provided to draw air in one direction through the passages in the rotor and, in the opposite direction, through the stator. Cooling means are positioned in the housing beyond the end of the rotor and stator and in the air stream. By such a construction, there is no conduction of heat from either the rotor or stator to the cooling means so that the rotor and stator may heat evenly even at light loads and, therefore, expand evenly. Additionally, the diameter of the motor or generator need not be greater than the diameter required to retain the stator itself.

In a preferred embodiment of the invention, a motor and generator of the high-frequency inductor-alternator type are positioned in the same case or housing. As the external diameter of the motor for equivalent power rating can be smaller than that of the generator and the clearances in the motor are not as critical as those on the generator, the cooling means are positioned externally of the motor stator and the cooling air is passed lengthwise over the cooling means, beyond the end of the motor and then axially downwardly through passages in the motor, through passages in the rotor stator, thence in the opposite direction through passages in the generator stator and again over the cooling means. A baffle is provided between the motor stator and the generator rotor to cause the air to flow axially in a continuous loop from one end of the housing to the other.

The principal object of the invention is the provision of new and improved rotating electrical equipment such as a motor, inductor alternator, or combination of both, which is relatively inexpensive to build, requires a minimum of materials for a given power output, is simple in construction, has a uniform, highly efficient cooling system and avoids all of the difficulties of the prior art.

Another object of the invention is the provision in equipment of the type referred to having axial air passages in both the rotor and the stator, cooling means positioned beyond the end of the rotor and the stator and means for circulating the air in opposite directions in the passages of the rotor and the stator and over the cooling means.

Another object of the invention is the provision of a new and improved high-frequency, motor-inductor-alternator unit which includes a motor and a generator positioned in a totally-enclosed housing, the motor and generator each including a rotor and a stator, the generator, respectively a rotor and a stator, the generator, rotor and stator each having axial passages therethrough, a baffle extending between the motor stator and the generator rotor, cooling means positioned about the motor stator and fan means for circulating the air axially through the passages and over the cooling means, with the air in the passages of the generator rotor and generator stator moving in opposite directions.

Another object is the provision of a new and improved rotor construction permitting axial passages of sufficient size to carry all of the cooling air for the generator whereby cooling air may pass in opposite directions over the stator and rotor.

Figure 2:
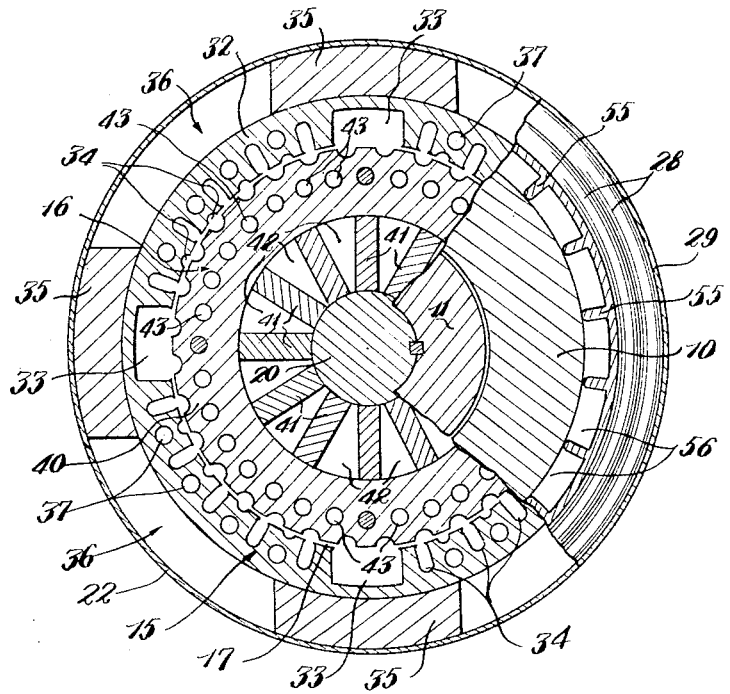

The invention will be specifically set forth and described in the claims appended hereto. The invention will be more fully described and may be more readily understood by reference to an arrangement of parts which comprises a preferred embodiment and this peferred embodiment will be described in detail in this specification and illustrated in the accompanying drawing which is a part hereof, and wherein:

Figure 1 is a side sectional view of a high-frequency, motor-generator unit of the inductor-alternator type; and Figure 2 is a sectional view of Figure 1 taken approximately on the line 2—2 thereof.

Referring now to the drawings wherein it should be emphasized that the showing is for the purposes of illustrating the invention only and not for the purposes of limiting it, the figures show a motor A and a generator B of the inductor-alternator type, both enclosed in a complete enclosure C.

The motor A includes, generally, a stator 10 and a rotor 11 separated by an air gap 12. In a like manner, the generator B includes a stator 15 and a rotor 16 separated therefrom by an air gap 17. The motor rotor 11 and the generator rotor 16 are both supported for rotation upon a common shaft 20.

The enclosure C comprises, generally, a base 21 on which is mounted bearing members 22 for rotatably supporting the lower end of the shaft 20. Enclosure C also comprises a generator-stator housing 22, a motor-stator housing 23 and an upper end bell 24 in which is mounted a bearing 25 to rotatably support the upper end of the shaft 20.

Cooling means 28 are mounted about the outer surface of the motor-stator housing 23 and the cooling means are, in turn, enclosed by a cooling-means housing 29 which has an outer diameter the same as that of the generator-stator housing 22 and forms, in effect, an extension thereof. This construction is possible because the outer diameter of the motor stator is designed sufficiently small in relation to the outer diameter of the generator stator that the increased radial thickness of the cooling means may be readily accommodated in a housing of the same diameter as the generator-stator housing 22.

The end bell 24 is mounted on the end of the motor housing 23 and, in turn, has a cover 30 spaced therefrom which forms an extension of the housing 29. As shown, the end bell 24 has a plurality of passages 31 therethrough communicating the upper end of the motor with the space occupied by the cooling means 28.

The motor stator 10 and motor rotor 11 are relatively conventional in construction and will not be further described here other than to say that they comprise, generally, the usual stock of magnetic laminations with electrical windings formed thereon. Preferably, the motor A is of such a construction as to rotate at approximately 3600 R. P. M.

The generator stator 15 and generator rotor 16 are constructed in accordance with the invention to have at least two sets of axial passages therethrough through which cooling air may be continuously circulated in opposite directions. The generator stator 15 comprises a hollow circular stack of laminations 32 which are slotted in the usual way to provide four field-pole slots 33 and a plurality of armature-coil slots 34 therebetween. The stator 15 also includes, radially outwardly of each field-coil slot 33, an axially extending member 35 of high magnetic permeability which forms, in effect, a flux bridge behind each field-coil slot as is more fully described in copending application Serial No. 221,502 filed April 17, 1951, now Patent No. 2,648,021. This entire stator member fits securely within the generator housing 22 and the outer surfaces of the laminations 32, the inner surfaces of the generator housing 22 and the sides of the flux-bridging members 35 form four axially extending passages 36 through which cooling air may flow and cool the generator stator 15. For the purpose of providing further cooling, the generator stator has a plurality of axially extending passages 37 between the inner and outer surfaces of the laminations 32.

The generator rotor 16 comprises, generally, a circular hollow stack of magnetic laminations 40 having an outer diameter such as to provide a relatively small clearance with the inner surface of the generator-stator laminations 32. This stack of laminations is supported relative to the shaft 20 by a plurality of radial webs 41 which extend axially along and are fixed to the outer surface of the shaft 20. These webs are generally flat and form a plurality of generally pie-shaped axial passages 42 therebetween through which cooling air may also pass. Additional passages 43 are formed in the rotor laminations to provide a passage for additional flow of air. Fan means 45 are positioned on the lower end of the generator rotor to draw air through the passages 42. Other fan means 46 are positioned adjacent the lower end of the passages 43 to also draw air therethrough. The fan means are conventional and will not be described further.

A generally cylindrical baffle 50 is supported on the lower end of the motor-stator housing 23 and extends toward the motor, terminating just short of the upper end of the generator rotor and radially inwardly of the air gap 17. Another baffle 51 extends downwardly from the lower end of the generator stator toward but spaced from the base 21 to restrict the flow of air through the passages 36 and force more of it through the passages 37.

Passages are also provided whereby cooling air may flow axially of the motor A. In the embodiment shown, this construction is obtained by generally corrugating the interior surface of the motor-stator housing 23 to provide a plurality of alternate inwardly extending ribs 55 and air passages 56.

The cooling means 28 may take any known form, either being formed as part of the motor housing or as shown by means of a helical coil of finned copper tubing, the ends of which (not shown) connect to a source of a cooling medium such as water.

In operation, upon energization of the motor A, the shaft 20 and the motor and generator rotors commence to rotate. The fan means 45, 46 on the lower end of the generator rotor 16 throw air radially outwardly by centrifugal force, thus drawing air radially downwardly through the passages 56, through the space between the motor rotor and the generator rotor and thence downwardly through the passages 42 and 43. The air, as it emerges from the fan means 45, 46, moves radially outwardly and thence radially upwardly through the air gap 17, the passages 36 and the passages 37. This air then passes over the cooling means 28 where it gives up any heat it carries to the cooling water in these cooling means. The air then passes over the upper end of the motor-stator housing 23 and thence downwardly to again traverse the same path, first picking up heat from the motor as it passes through the passages of the rotor and then still more heat as it passes through the passages of the generator stator.

It will be noted from the construction shown and described that there will be some cooling of the motor stator by means of heat conducted directly through the motor-stator housing 23 to the cooling means 28. However, with motors of the conventional type used in equipment of this type, the air gap is usually sufficiently large that any differences in temperature of the motor rotor and motor stator which might cause differences in the expansion of the two members will not cause difficulties of rubbing or the like. However, in the inductor alternator where the clearances between the rotor and stator must be held to a minimum it will be seen that there can be no cooling of either member by direct heat conduction to the cooling means. Also, because the rotor and stator are in series in the same air stream, the temperatures of each will tend to vary up and down in equal proportions.

There are, obviously, other combinations which may be employed in accordance with the invention. For example, by adjusting the position of the lower end of the baffle 50, the direction of flow of cooling air in the passages 37 or in the air gap 17 or in the passages 38 may be reversed in direction. However, the baffle, as shown, has worked out extremely satisfactorily in practice and is the preferred method.

Thus it will be seen that there has been described an embodiment of the invention which is capable of accomplishing all of the objects thereof and others and which provides an extremely simple cooling system which is efficient and intended to maintain a uniform housing particularly in the generator M which, in times past, has been the difficult element in equipment of this type.

It will be appreciated that modifications and alterations will occur to others upon a reading and understanding of this specification and it is our intention to include all such modifications and alterations insofar as they come within the scope of the appended claims.

Having thus described our invention, we claim:

1. Rotating electrical apparatus comprising a motor and a generator in side-by-side relationship each comprising a rotor and a stator, each stator including an outer shell, said generator rotor and said motor each having radially closed axial passages therethrough forming a continuous radially closed passage from one end of the apparatus to the other, said generator stator also having a radially closed axial passage therethrough, a housing surrounding said motor in spaced relationship therewith and forming, with said generator stator passage, a radially closed axial passage extending from one end of said apparatus to the other, means at each end of said apparatus communicating said passages and blower means for causing cooling air to circulate in a closed path axially passed said motor, then passed said generator rotor and then in the opposite direction passed said generator stator and in the space between said motor shell and said surrounding housing.

2. The combination of claim 1 wherein cooler means are positioned between said housing and said motor.

3. The combination of claim 1 wherein circumferentially continuous baffle means are provided between said motor stator and said generator rotor.

4. The combination of claim 1 wherein circumferentially continuous baffle means are provided between said motor stator and said generator rotor and cooler means are disposed in the passage between said housing and said motor.

5. The combination of claim 1 wherein said generator rotor comprises a shaft and a stack of generally circular magnetic laminations, together with spacing means mounting said laminations on said shaft, and providing a plurality of axial openings through said generator rotor, said stack of laminations also having a plurality of axially extending passages therethrough.

6. The combination of claim 5 wherein blower means are provided for moving air through the passages of said means and other blower means are provided for moving air in the same direction through the passages in the laminations.

References Cited in the file of this patent

UNITED STATES PATENTS

| Number | Name | Date |
| --- | --- | --- |
| 1,885,546 | Rice | Nov. 1, 1932 |
| 1,906,849 | Fleischmann | May 2, 1933 |
| 2,179,561 | Oesterlein | Nov. 14, 1939 |
| 2,264,268 | Arnold | Dec. 2, 1941 |
| 2,505,795 | Schwan | May 2, 1950 |
| 2,573,383 | Beckwith | Oct. 30, 1951 |
| 2,610,992 | Johns | Sept. 16, 1952 |

FOREIGN PATENTS

| Number | Country | Date |
| --- | --- | --- |
| 596,604 | Great Britain | Jan. 7, 1948 |